US011928117B2

(12) United States Patent
Wang et al.

(10) Patent No.: US 11,928,117 B2
(45) Date of Patent: Mar. 12, 2024

(54) LIVE COMMENT MANAGEMENT (71) Applicant: International Business Machines Corporation, Armonk, NY (US)

(72) Inventors: Wen Wang, Beijing (CN); Yi Chen Zhong, Shanghai (CN); Kun Yan Yin, Ningbo (CN); De Shuo Kong, Beijing (CN); Lu Yu, Shanghai (CN); Yi Ming Wang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/355,312

(22) Filed: Jun. 23, 2021

(65) Prior Publication Data

US 2022/0414107 A1 Dec. 29, 2022

(51) Int. Cl.
G06F 16/24 (2019.01)
G06F 16/2457 (2019.01)
G06N 5/02 (2023.01)
H04N 21/4788 (2011.01)
G06F 40/205 (2020.01)
H04L 67/10 (2022.01)

(52) U.S. Cl.
CPC ......... G06F 16/24578 (2019.01); G06N 5/02 (2013.01); H04N 21/4788 (2013.01); *G06F 40/205* (2020.01); *H04L 67/10* (2013.01)

(58) Field of Classification Search
CPC ............ G06F 16/24578; G06F 40/205; G06F 16/7867; G06F 40/279; G06F 16/787; G06N 5/02; G06N 5/022; H04N 21/4788; H04N 21/4722; H04N 21/8547; H04L 67/10; H04L 67/104; H04L 67/01
See application file for complete search history.

(56) References Cited

U.S. PATENT DOCUMENTS 10,037,320 B2 * 7/2018 Amin ................. G06F 40/166
2007/0239694 A1 * 10/2007 Singh ................. G06F 16/9024
(Continued)

FOREIGN PATENT DOCUMENTS

| CN | 106960042 A | 7/2017 |
|---|---|---|
| CN | 109408639 A | 3/2019 |

OTHER PUBLICATIONS

Banerjee, Snehasish, "Analysis of user-generated comments posted during live matches of the Cricket World Cup 2015", Online Information Review, ISSN 1468-4527, White Rose Research Online, 2018, 31 Pages.

(Continued)

*Primary Examiner* — Hosain T Alam
*Assistant Examiner* — Cecile H Vo
(74) *Attorney, Agent, or Firm* — Stephanie L. Carusillo (57) ABSTRACT

Embodiments of the present invention relate to methods, systems, and computer program products for managing a plurality of live comments. A plurality of live comments is obtained for a video, the plurality of live comments being associated with a plurality of fragments in the video, respectively. A plurality of features are extracted from the plurality of live comments, respectively. A knowledge base is generated for the plurality of live comments based on the plurality of features. With these embodiments, the live comments may be managed in an effective way. Further, the knowledge base may provide answers to a user query.

16 Claims, 7 Drawing Sheets

(56) References Cited

U.S. PATENT DOCUMENTS

| | | | | |
|---|---|---|---|---|
| 2016/0358086 | A1* | 12/2016 | Sundram | G06F 40/30 |
| 2017/0139921 | A1* | 5/2017 | Ball | G06F 16/24578 |
| 2018/0075460 | A1 | 3/2018 | Takeda | |
| 2018/0349355 | A1* | 12/2018 | Shi | G06F 40/284 |
| 2019/0206408 | A1* | 7/2019 | Qi | G10L 15/22 |
| 2021/0051124 | A1* | 2/2021 | Kumar | G06Q 50/01 |

OTHER PUBLICATIONS

Ping et al., "Video Highlights Detection and Summarization with Lag-Calibration based on Concept-Emotion Mapping of Crowd-sourced Time-Sync Comments", EMNLP 2017 Workshop on New Frontiers in Summarization, arXiv:1708.02210 [cs.CL], Aug. 7, 2017, 11 Pages.

Poché et al., "Analyzing User Comments on YouTube Coding Tutorial Videos", 2017 IEEE 25th International Conference on Program Comprehension (ICPC), Buenos Aires, Argentina, May 22-23, 2017, 11 Pages.

Ponzanelli et al., "Too Long; Didn't Watch! Extracting Relevant Fragments from Software Development Video Tutorials", ICSE '16: Proceedings of the 38th International Conference on Software Engineering, May 2016, 12 Pages.

Sun et al., "Movie summarization using bullet screen comments", Multimedia Tools and Applications, vol. 77, 2018, 18 Pages.

Zhang, Chao, "Research on Automatic Summarization of Time-sync Video Comments", University of Science and Technology of China, Computer Software and Theory, Apr. 2017, 2 Pages. (Abstract Only).

Mell et al., "The NIST Definition of Cloud Computing", Recommendations of the National Institute of Standards and Technology, NIST Special Publication 800-145, Sep. 2011, 7 pages.

\* cited by examiner

LIVE COMMENT MANAGEMENT

BACKGROUND

The present invention relates to comment management, and more specifically, to managing live comments for a video.

Nowadays, online video playback is very popular and various online players are developed, which allow viewers to submit live comments for a fragment in a video that is played. Here, a live comment is also referred to as "a bullet screen comment" or "a bullet screen" for representing a real-time comment from a viewer that is flying across the screen like a bullet. Usually, the live comments may relate to discussions among viewers and these live comments may include rich knowledge about the video. For example, the live comments may include discussions related to a name and basic information of background music (abbreviated as BGM), the actor/actress, and so on. At this point, how to extract useful information from the massive live comments becomes a focus.

SUMMARY

According to embodiments of the present invention, there is provided a computer-implemented method that may be implemented by one or more processors. In the method, one or more processors obtain a plurality of live comments for a video, the plurality of live comments being associated with a plurality of fragments in the video, respectively. One or more processors extract a plurality of features from the plurality of live comments, respectively. One or more processors generate a knowledge base for the plurality of live comments based on the plurality of features.

According to another embodiment of the present invention, there is provided a computer-implemented system. The computer-implemented system comprises a computer processor coupled to a computer-readable memory unit, where the memory unit comprises instructions that when executed by the computer processor implements the above method.

According to another embodiment of the present invention, there is provided a computer program product. The computer program product comprises a computer readable storage medium having program instructions embodied therewith. The program instructions are executable by an electronic device to cause the electronic device to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
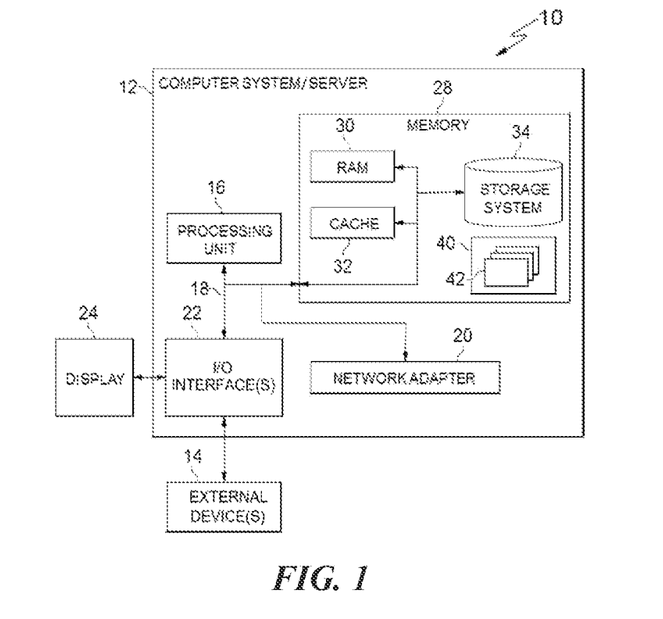
FIG. 1 depicts a cloud computing node according to embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
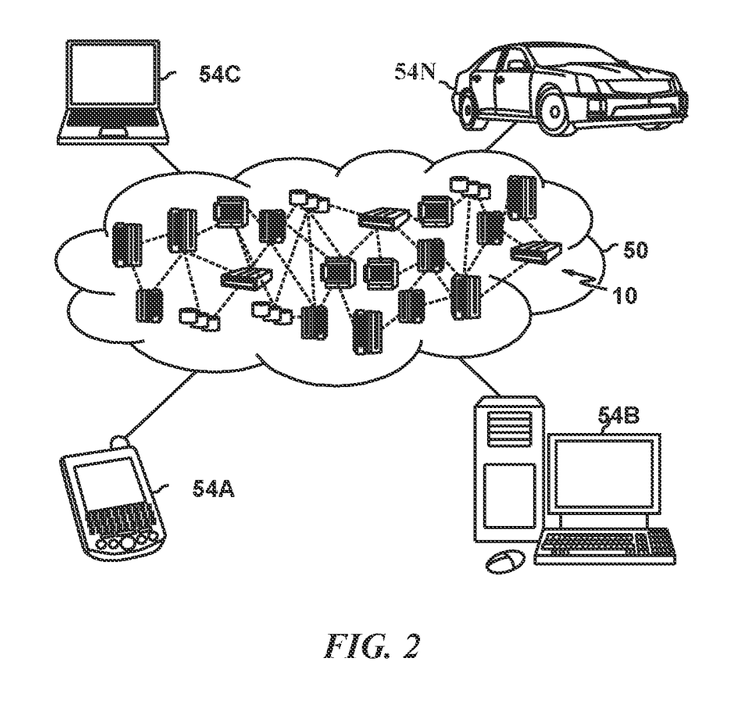
FIG. 2 depicts a cloud computing environment according to embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
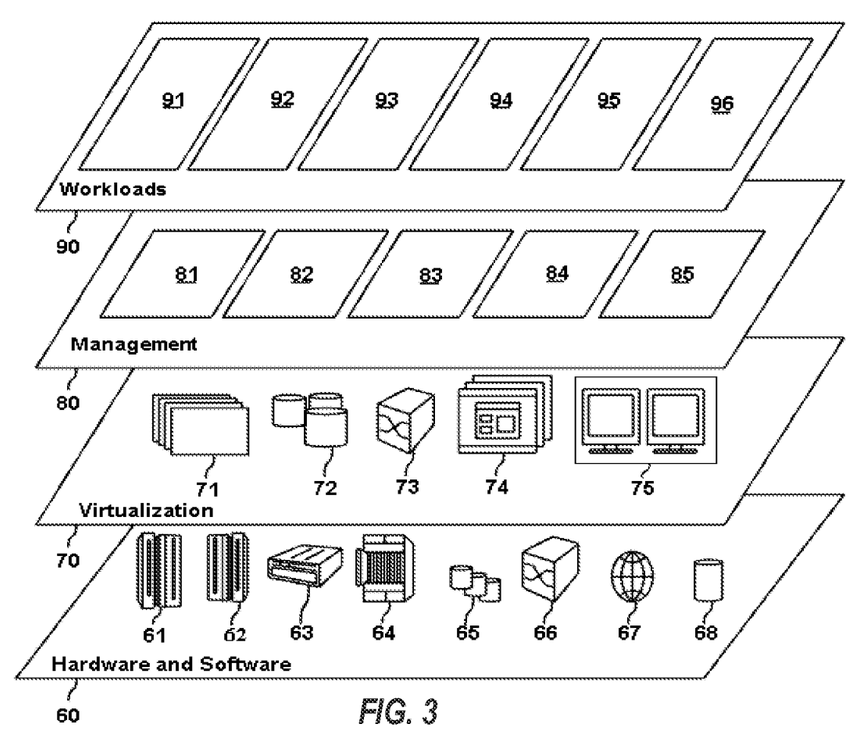
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and live comment processing 96.

Figure 4:
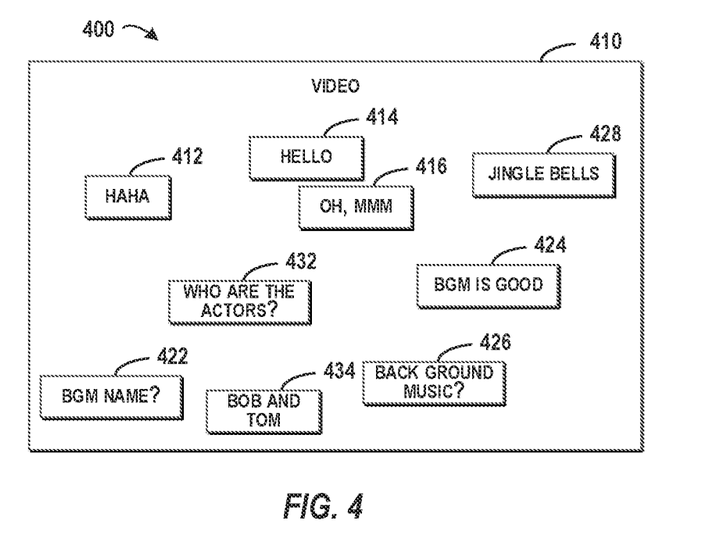
FIG. 4 depicts an example diagram of a plurality of live comments for a video to which embodiments of the present invention may be implemented.

It should be noted that the live comment processing 96 according to embodiments of the present invention could be implemented by computer system/server 12 of FIG. 1. Reference will be made to FIG. 4 for a brief description of a working environment of the invention. FIG. 4 depicts an example diagram 400 of a plurality of live comments for a video to which embodiments of the present invention may be implemented. In FIG. 4, viewers of a video 410 may submit a plurality of live comments, such as 412, 414, 416, 422, 424, 426, 428, 432, and 434. Here, these live comments relate to various aspects of one or more fragments in the video 410. For example, a viewer may submit the live comment 422 with a text of "BGM name?" for asking the name of the background music when the background music is played in a fragment in the video 410. Then, another viewer may answer the question by submitting a live comment 428 with a text of "Jingle Bells." As depicted in FIG. 4, there may be more live comments relating to other aspects such as the actors in the video 410.

The duration of the video 410 may be very long and live comments may be submitted at various time points during playing the video 410. Therefore, the number of live comments may reach a huge number, sometimes the number may be in an order of a million for a popular movie. As the live comments may include rich knowledge about the video, how to manage these live comments and extract knowledge therefrom becomes a hot focus.

According to some solutions, the viewer can submit live comments and review live comments that are submitted by themselves or by other viewers. Although these live comments may be displayed in different colors, when a great number of live comments are displayed in an overlapped way and flying across the screen fast, it is difficult for the viewer to obtain useful information from the live comments.

Figure 5:
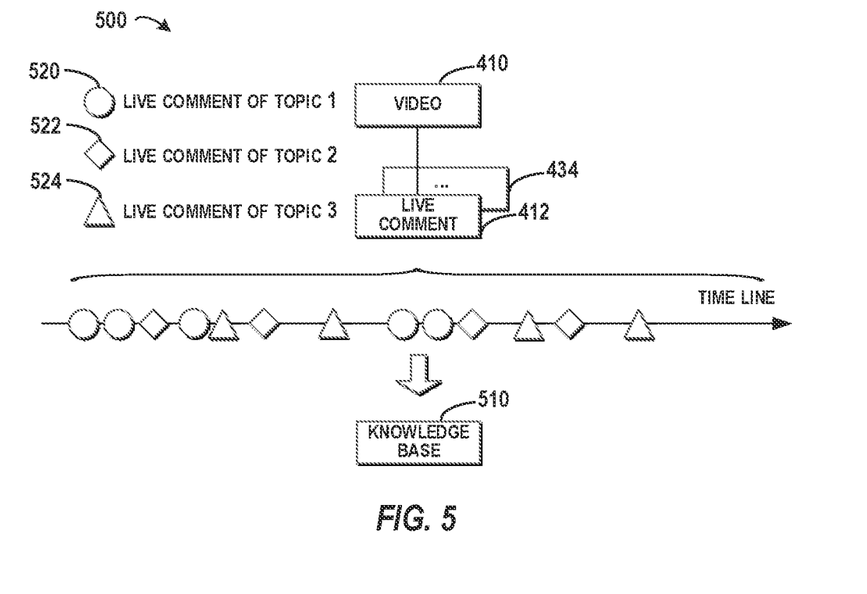
FIG. 5 depicts an example diagram for managing live comments according to embodiments of the present invention.

In view of the above drawbacks, embodiments of the present invention provide an effective solution for managing a plurality of live comments for a video. Reference will be made to FIG. 5 for a brief of the present invention, here FIG. 5 depicts an example diagram 500 for managing live comments according to embodiments of the present invention. In FIG. 5, a plurality of live comments 412, . . . , 434 for the video 410 may be classified into different topics. Here, a legend 520, a legend 522, and a legend 524 with different shapes may represent live comments with different topics. For example, the legend 520 may relate to the background music (topic 1), the legend 522 may relate to the actors (topic 2), and the legend 524 may relate to the important events in the video 410 (topic 3).

In FIG. 5, the timeline shows a time relationship among these live comments 412, . . . , and 434. Specifically, each of the live comments 412, . . . , and 434 is represented by a pattern. For example, a round pattern represents a live comment that is classified into the topic 1, a diamond pattern represents a live comment that is classified into the topic 2, and a triangle pattern represents a live comment that is classified into the topic 3. Here, a position of the pattern in the timeline indicates a time point when the live comment is submitted by a viewer. The position may be represented by an offset between a starting point of the video 410 and the time point when the live comment is submitted.

Further, a knowledge base 510 may be generated for the live comments 412, . . . , and 434, and the knowledge base 510 may include various aspects of the video 410 that are extracted from the live comments. Here, the knowledge base 510 may facilitate in managing the video 410 and the live comments. For example, the knowledge base 510 may work as an index for the massive live comments, and then the knowledge base 510 may be searched for finding answers to questions related to the video 410. Further, illegal information may be identified in the live comments, and detailed information about the video 410 may be managed in an effective way.

Figure 6:
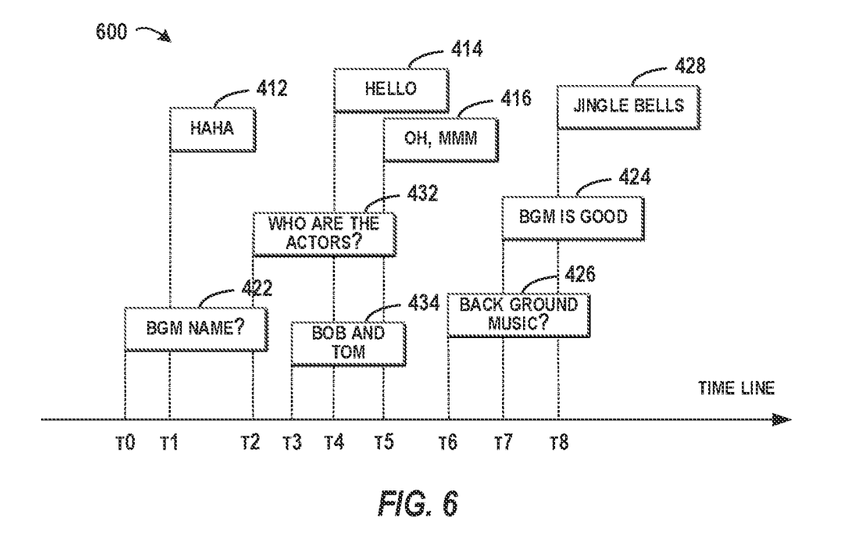
FIG. 6 depicts an example diagram of a timeline for a video according to embodiments of the present invention.

Hereinafter, reference will be made to FIG. 6 for more details about obtaining the plurality of live comments. FIG. 6 depicts an example diagram 600 of a timeline for a video according to embodiments of the present invention, where viewers submit various live comments at various time points for various fragments in the video 410. As shown in FIG. 6, each live comment may include a text and have a corresponding time point. For example, the live comment 422 may include a text "BGM name?" and is submitted at the time point T0, and the live comment 412 may include a text "haha" and is submitted at the time point T1. Similarly, other live comments are submitted at the time points T2 to T8, respectively. Here, the live comments 412, . . . , and 434 may be stored in a file (or in another format associated with the video 410), and then the file may be parsed for obtaining the live comments 412, . . . , and 434.

Once the live comments 412, . . . , and 434 are obtained, each of the obtained live comments may be parsed for extracting one or more features. In some embodiments, the feature may include a text feature for representing a text of the live comment. Here, each live comment may be processed to extract a corresponding text feature. Specifically, a text feature for the live comments 422 may include "BGM name?" . . . , and a text feature for the live comments 428 may include "Jingle Bells." In some embodiments, the feature may include a time feature for representing a time point of a fragment in the video when the live comment is submitted. For example, each live comment may be processed to extract a corresponding time feature. Specifically, a time feature for the live comments 422 may include the time point T0 (for example, 00:31:00 in the video 410), . . . , and a time feature for the live comments 428 may include the time point T8 (for example, 00:32:00 in the video 410).

Figure 7:
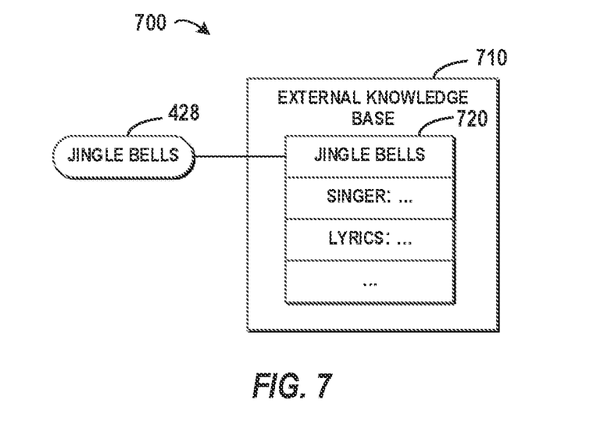
FIG. 7 depicts an example diagram for extracting an external feature from an external knowledge base according to embodiments of the present invention.

In some embodiments, the feature may include an external feature for representing a data item that is obtained from an external knowledge base. Here, the text of the live comment may be searched in the external knowledge base for more information about the live comment. FIG. 7 depicts an example diagram 700 for determining an external feature from an external knowledge base according to embodiments of the present invention. In FIG. 7, the text feature "Jingle Bells" for the live comment 428 may be searched in an external knowledge base 710 for obtaining more details about the song "Jingle Bells." At this point, the external feature 720 for the live comment 428 may include a name of the song, a singer of the song, lyrics of the song and so on. In another example, the text feature "BGM name" for the live comment 422 may be searched in the external knowledge base for determining the meaning of the abbreviation "BGM." At this point, the external feature for the live comment 422 may include: BGM is the abbreviation of background music.

In some embodiments, features for the live comments may be represented in a vector format including multiple dimensions. For example, features for the live comment 422 may be represented as: ("BGM name?"; T0; BGM the abbreviation of background music), and features for the live comment 428 may be represented as: (Jingle Bells; T8; name=Jingle Bells, singer=*, lyrics=*). It is to be understood that the above vectors are just example formats for storing the features, alternatively and/or in addition to, the features may be stored in another format.

In some embodiments, the feature may include a time relevance feature for representing a time relationship between the live comment and a further live comment in the plurality of live comments. Taking the live comments 412 and 422 as examples, the live comment 412 is submitted at the time point T1 and the live comment 422 is submitted at the time point T0, and thus the time relevance feature for the live comment 422 in relative to the live comment 412 may be determined by a time difference between the time features for the live comments 422 and 412: T1-T0.

Figure 8:
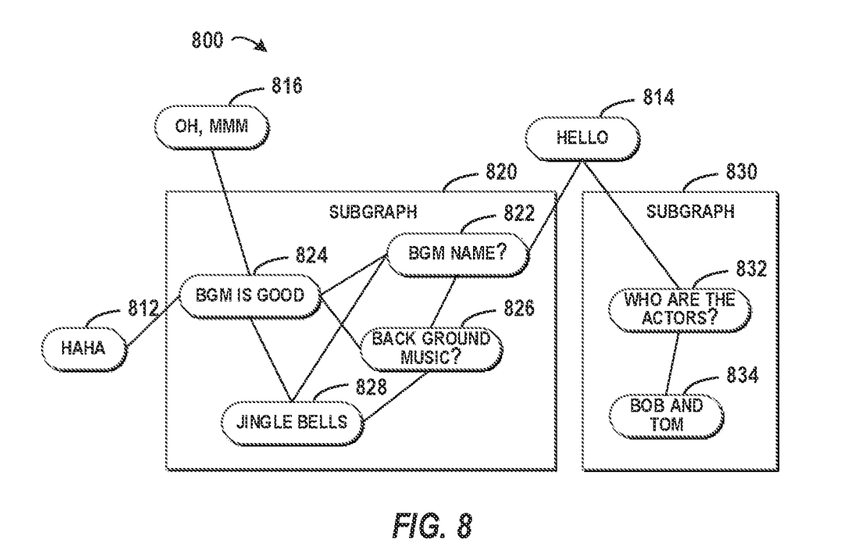
FIG. 8 depicts an example diagram for generating a graph based on a plurality of live comments according to embodiments of the present invention.

In some embodiments, in order to build the knowledge base 510, a graph may be generated based on the plurality of features. Here, the graph includes: a plurality of nodes that are respectively corresponding to the plurality of live comments, and a plurality of edges among the plurality of nodes. Reference will be made to FIG. 8 for more information about the graph, where FIG. 8 depicts an example diagram for generating a graph 800 based on a plurality of live comments according to embodiments of the present invention. In FIG. 8, the graph 800 includes multiple nodes 812, 814, 816, 822, 824, 826, 828, 832, and 834, which are corresponding to the multiple live comments 412, 414, 416, 422, 424, 426, 428, 432, . . . , and 434, respectively. Here, each of the multiple nodes is generated for a live comment. Taking the node 812 as an example, the node 812 is corresponding to the live comment 412 and is generated based on the text feature of the live comment 412. Similarly, other nodes 814, . . . , and 834 are generated from text features of the live comments 414, . . . , and 434, respectively.

As shown in FIG. 8, an edge may be added between two nodes corresponding to two live comments based on a relevance degree between the two live comments. In some embodiments, the relevance degree may be determined based on various aspects. For example, each node may be allocated with a node weight, and then the relevance degree may be determined based on node weights for the two nodes. Specifically, the node weight may be determined based on the text feature and the external feature for the live comment. For example, semantic analysis may be implemented to the language of the text feature and the external feature so as to determine a node weight making the live comment 422 as an example, the text feature "BGM name" and the external feature "Jingle Bells; T8; name=Jingle Bells, single=*, lyrics=*" show that the live comment 422 is about the background music, and then the node weight may be mapped to a value corresponding to the background music.

In some embodiments, the relevance degree between two live comments may depend on the node weights of the two nodes (a node i and a node j) according to the following Formula 1: RelevanceDegree(i,j)=NodeWeight(i)+NodeWeight(j)), where RelevanceDegree(i,j) represents a relevance degree between two live comments corresponding to the node i and the node j, NodeWeight(i) represents a node weight for the node i, and NodeWeight(j) represents a node weight for the node j.

It is to be understood that the above Formula 1 is just an example for determining the relevance degree, alternatively and/or in addition to, a time relevance feature may be considered in determining the relevance degree. Here, the time relevance feature for the live comment 422 in relative to the live comment 412 is represented as a time difference of T1-T0. Here, on or more intervals may be predefined, and the time difference may be mapped to a corresponding coefficient if the time difference belongs a certain interval. For example, if the time difference is between 5 seconds, the time relevance feature may be mapped to a coefficient of "0.8;" and if the time difference is between 5-10 seconds, the time relevance feature may be mapped to a coefficient of "0.6." In other words, the greater the time difference is, the lower the coefficient is. In some embodiments, the relevance degree may be determined based on the following Formula 2: RelevanceDegree(i,j)=NodeWeight(i)*relevance(i,j)+NodeWeight(j)), where RelevanceDegree(i,j) represents a relevance degree between two live comments corresponding to the node i and the node j, NodeWeight(i) represents a node weight for the node i, NodeWeight(j) represents a node weight for the node j, and relevance (i, j) represents coefficient obtained based on the time difference between the two live comments.

It is to be understood that the above Formulas 1 and 2 are just examples for determining the relevance degree, alternatively and/or in addition to, another formula may be adopted. For example, the following Formula 3 may be used to determine the relevance degree: RelevanceDegree(i,j)= relevance(i,j)+comp(Topic(i),Topic(j)), where RelevanceDegree(i,j) represents a relevance degree between two live comments corresponding to the node i and the node j, Topic(i) represents a topic for the node i, Topic(j) represents a topic for the node j, and relevance(i,j) represents coefficient obtained based on the time difference between the two live comments, and comp(Topic(i),Topic(j)) represents a comparison result between the topics for the node i and the node j. If the two nodes relate to a same topic, the comparison result may be assigned to a higher value, and otherwise the comparison result may be assigned to a lower value.

In some embodiments, the above procedure may be implemented to each pair of live comments in the plurality of live comments, such that a relevance degree may be determined between each pair of live comments. If the relevance degree is above a predefined threshold, an edge may be added between two nodes corresponding to the two live comments. When all the live comments 412, . . . , 434 are processed, the graph 800 may be obtained. Further, the graph 800 may be partitioned into one or more subgraphs based on the plurality of nodes and the plurality of edges. Here, existing algorithms may be used for the graph partition. For example, a subgraph 820 and a subgraph 830 may be obtained based on relevance degrees for the edges in the graph 800. In another example, the subgraphs may be obtained in another way, for example, by a clustering algorithm.

As shown in FIG. 8, nodes in a single subgraph have higher relevance degrees and more similarities. For example, the nodes 822, 824, 826 and 828 are relating to the topic of the background music, and the nodes 832 and 834 are relating to the topic of the actors. Therefore, these subgraphs 820 and 830 may be used for building knowledge models in the knowledge base 510. Specifically, a topic may be extracted for the subgroup based on text features and external features for the nodes that are included in the subgroup, and then a knowledge model may be built for the topic.

Figure 9:
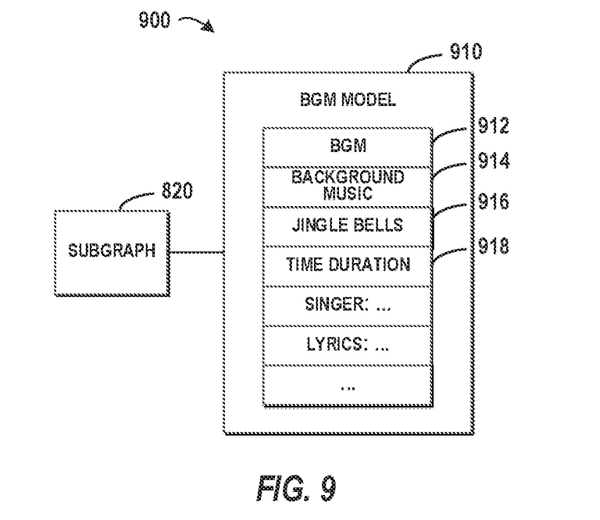
FIG. 9 depicts an example diagram for building a knowledge model according to embodiments of the present invention.

Referring to FIG. 9 for more details, here FIG. 9 depicts an example diagram 900 for building a model in a knowledge base according to embodiments of the present invention. In FIG. 9, a BGM model 910 is built for the subgraph 820, and the BGM model 910 may include multiple knowledge items. For example, an item 912 may indicate the topic relates to "BGM," an item 914 may indicate that "BGM" is the abbreviation of background music, an item 916 may indicate a name of the BGM, an item 918 may indicate that the time duration (for example, 00:35:40-00:36:20) when the BGM is played in the video 410, and so on. It is to be understood that the above FIG. 9 is just an example data structure of the BGM model 910. Alternatively and/or in addition to, the knowledge about the BGM may be stored in another format.

Figure 10:
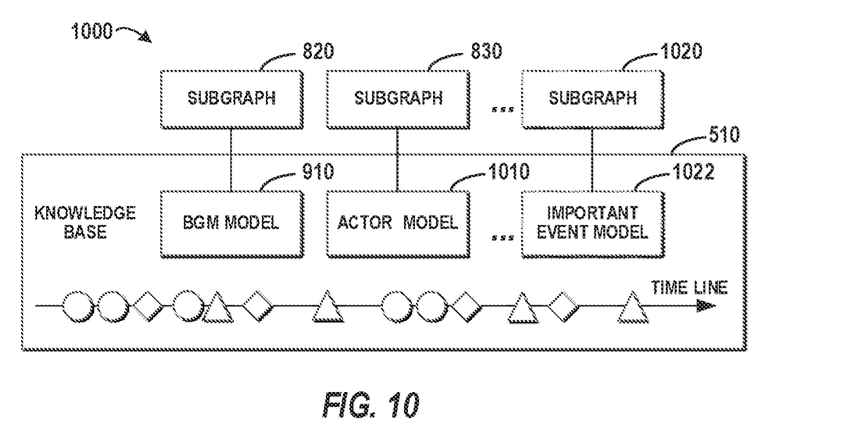
FIG. 10 depicts an example diagram for building a knowledge base according to embodiments of the present invention.

Further, all the subgraphs in FIG. 8 may be processed in a similar way and thus multiple knowledge models may be generated for the multiple subgraphs. FIG. 9 depicts an example diagram 900 for building a knowledge base according to embodiments of the present invention. As shown in FIG. 10, the BGM model 910 is built based on the subgraph 820, the actor model 1010 is build based on the subgraph 830. Further, more models may be built from other subgraphs. Supposing the viewers also submit live comments relating to important events happened in the video 410, then an important event model 1022 may be built based on a subgraph 1020 related to the important events. Further, the knowledge base 510 may include the timeline for the live comments, which includes a chronological order of the live comments.

The preceding paragraphs have described the procedure for generating the knowledge base 510. Once the knowledge base 510 is generated, the knowledge base 510 may be searched for providing answers to users. Here, users may enter their questions via various types of user interfaces. In one situation, a viewer of the video 410 may submit a live comment requesting details about the BGM, and reference will be made to FIG. 10 for more details for the situation.

Figure 11:
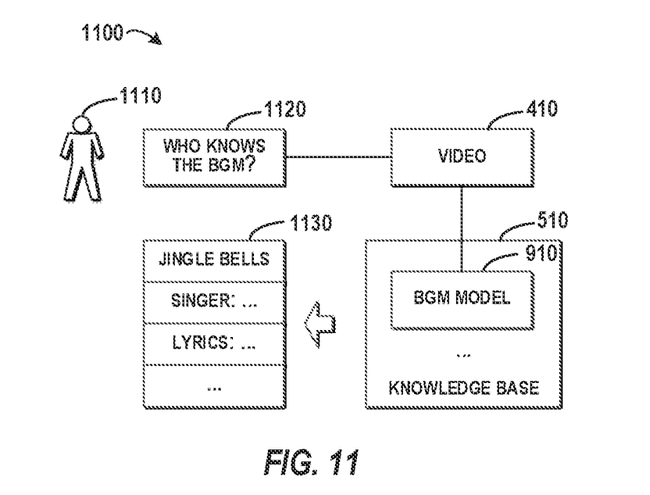
FIG. 11 depicts an example diagram for processing a further live comment based on a knowledge base according to embodiments of the present invention.

FIG. 11 depicts an example diagram 1100 for processing a further live comment based on a knowledge base according to embodiments of the present invention. In FIG. 11, a viewer 1110 who is watching the video 410 may submit a live comment 1120 for asking the name of the BGM. At this point, the text feature "who knows the BGM" and the time feature (for example, time point T) may be extracted and use as keywords for searching in the knowledge base 510. Based on the keywords, the BGM model 910 may be found in the knowledge base 510. Next, an answer may be found in the BGM model 910 and then provided to the viewer 1110. For example, the answer 1130 may include one or more items such as a name of the BGM "Jingle Bells," a singer of the song, lyrics of the son, and so on. In one example, the answer 1130 may be displayed in the screen as a live comment near the live comment 1120. In order to attract the viewer's attention, the answer may be heighted and/or display in a larger font size. Alternatively and/or in addition to, the answer may be displayed in a separate dialog. Therefore, the viewer 1110 may see the answer immediately in an effective and easy way.

Figure 12:
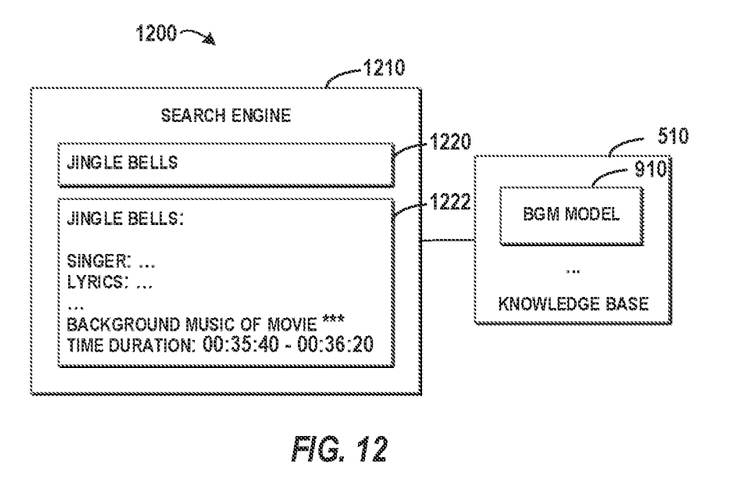
FIG. 12 depicts an example diagram for providing a search result based on a knowledge base according to embodiments of the present invention.

In another situation, the knowledge base 510 may be used as a knowledge database for a search engine. Referring to FIG. 12, this figure depicts an example diagram 1200 for providing a search result based on a knowledge base according to embodiments of the present invention. In FIG. 12, a user may input the keyword "jingle bells" in the search field 1220 in a search engine 1210. At this point, the keyword may be searched in the knowledge base 510. As the BGM model 910 includes the time durations related to the BGM, in addition to the basic information of the music, the knowledge base 510 may also provide the time duration when the music is played in the video. Specifically, the search result 1222 may include a name of the song, a singer of the song, lyrics of the song, a name of a movie which uses the song as the BGM, and the time duration when the song is played in the movie. With these embodiments, the rich knowledge that is extracted from previous live comments may provide answers to users' questions.

In some embodiments, live comments for multiple videos in a multimedia database may be managed based on the above procedure. At this point, songs that are played in the multiple videos may be identified, further locations of the songs may also be found in these videos. Therefore, the knowledge base 510 may be used for copyright protection. For example, if the knowledge base 510 indicates that a song is used in a video illegally, then the video and an author of the video may be easily found. With these embodiments, the knowledge base 510 may facilitate in obtaining basic information of the videos without a need to analyzing the videos files.

It is to be understood that the above embodiments describe how to the knowledge base 510 by taking the BGM and the actors as examples. In other embodiments, the live comments may relate other topics. For example, the viewers may discuss a historic site that appears in a fragment in the video 410. Then, a knowledge model including a name, a location, and a history story of the historic site, and so on may be generated for the historic site. With these embodiments, various types of knowledge may be obtained from the live comments. Therefore, besides functions of social communications and entertainments, the live comments may provide more useful information about the video 410. Especially, due to the live comments are closely linked to the timeline of the video, the knowledge related to the timeline is extracted in an easy and effective way.

The present invention may be a system, a method, and/or a computer program product at any possible technical detail level of integration. The computer program product may include a computer readable storage medium (or media) having computer readable program instructions thereon for causing a processor to carry out aspects of the present invention.

Figure 13:
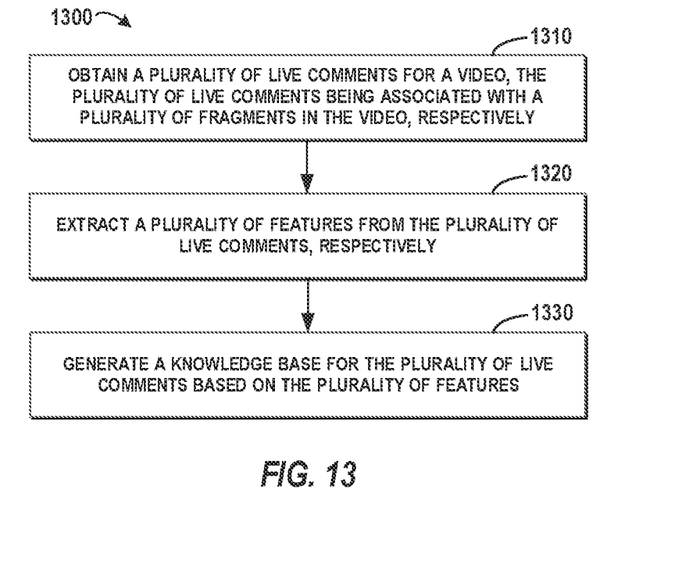
FIG. 13 depicts an example flowchart of a method for managing a plurality of live comments according to embodiments of the present invention.

Reference will be made to FIG. 13 for more details about embodiments of the present invention. FIG. 13 depicts an example flowchart of a method 1300 for managing a plurality of live comments according to embodiments of the present invention. At block 1310, a plurality of live comments for a video are obtained, the plurality of live comments being associated with a plurality of fragments in the video, respectively. At block 1320, a plurality of features are extracted from the plurality of live comments, respectively. At block 1330, a knowledge base is generated for the plurality of live comments based on the plurality of features. In some embodiments, with respect to a live comment in the plurality of live comments, the feature for the live comment comprises any of: a text feature for representing a text of the live comment; a time feature for representing a time point of a fragment in the video when the live comment is submitted; an external feature for representing a data item that is obtained from an external knowledge base; and a time relevance feature for representing a time relationship between the live comment and a further live comment in the plurality of live comments.

In some embodiments, in order to generate the knowledge base, a graph is generated based on the plurality of features, the graph including: a plurality of nodes respectively corresponding to the plurality of live comments and a plurality of edges among the plurality of nodes. The graph is divided into at least one subgraph based on the plurality of nodes and the plurality of edges. At least one knowledge model that is included in the knowledge base is build based on the at least one subgraph. In some embodiments, with respect to the live comment in the plurality of live comments, a node in the plurality of nodes that is corresponding to the live comment is generated based on any of the text feature and the external feature for the live comment. In some embodiments, with respect to the live comment and the further live comment, a relevance degree is determined between the live comment and the further live comment based on features for the live comment and the further live comment. Next, in response to the relevance degree being above a predefined threshold, an edge is added between a node corresponding to the live comment and a further node corresponding to the further live comment.

In some embodiments, a weight is generated for the live comment based on the text feature and the external feature for the live comment. A further weight is determined for the further live comment based on a text feature and an external feature for the further live comment, and then the relevance degree is determined based on the weight and the further weight. In some embodiments, the relevance degree is updated based on the time relevance for the live comments. In some embodiments, with respect to a subgraph in the at least one subgraph, a topic is generated for the subgroup based on a group of text features and external features for a group of nodes that are included in the subgroup. A knowledge model is built in the at least one model based on the topic. In some embodiments, in response to detecting that a further live comment that is inputted by a user relates to a question, the knowledge base is searched for an answer to the question. In some embodiments, in response to receiving a query that is inputted by a user related to the video, searching the knowledge base for an answer related to the query.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, a plurality of live comments for a video, the plurality of live comments being associated with a plurality of fragments in the video, respectively;
classifying, by the one or more processors, each live comment of the plurality of live comments into a topic of a plurality of topics associated with the video;
extracting, by the one or more processors, a plurality of features from the plurality of live comments, respectively, wherein the plurality of features comprises a text feature for representing a text of a particular live comment, a time feature for representing a time point of a fragment in the video when a particular live comment is submitted, and a time relevance feature for representing a time relationship between a first live comment and a second live comment in the plurality of live comments;
generating, by the one or more processors, a knowledge base for the plurality of live comments based on the plurality of features and the plurality of topics, wherein the knowledge base acts as a searchable index for the plurality of live comments, wherein generating the knowledge base comprises:
generating, by the one or more processors, a graph based on the plurality of features, the graph including: a plurality of nodes respectively corresponding to the plurality of live comments and a plurality of edges among the plurality of nodes;
dividing, by the one or more processors, the graph into at least one subgraph based on the plurality of nodes and the plurality of edges; and
building, by the one or more processors, at least one knowledge model that is included in the knowledge base based on the at least one subgraph; and
in response to detecting that a further live comment has been inputted by a user and includes a question regarding a live comment of the plurality of comments or the video, identifying, by the one or more processors, a respective topic of the plurality of topics of the further live comment and searching, by the one or more processors, the knowledge base for an answer to the question based on the topic.

2. The method of claim 1, wherein the plurality of features further comprises an external feature for representing a data item associated with a particular live comment that is obtained by searching the text feature in an external knowledge base.

3. The method of claim 1, wherein the plurality of features further comprises an external feature for representing a data item associated with a particular live comment that is obtained by searching the text feature in an external knowledge base and wherein generating the graph comprises:
generating, by the one or more processors, the plurality of nodes by, with respect to the live comment in the plurality of live comments, generating a node in the plurality of nodes that is corresponding to the live comment based on at least one of the text feature and the external feature for the live comment.

4. The method of claim 3, wherein generating the graph further comprises:
generating, by the one or more processors, the plurality of edges by, with respect to the live comment and the further live comment:
determining, by the one or more processors, a relevance degree between the live comment and the further live comment based on features for the live comment and the further live comment; and
in response to the relevance degree being above a predefined threshold, adding, by the one or more processors, an edge between the node corresponding to the live comment and a further node corresponding to the further live comment.

5. The method of claim 4, wherein determining the relevance degree comprises:
obtaining, by the one or more processors, a weight for the live comment based on the text feature and the external feature for the live comment;
obtaining, by the one or more processors, a further weight for the further live comment based on a further text feature and an external feature for the further live comment; and
determining, by the one or more processors, the relevance degree based on the weight and the further weight.

6. The method of claim 5, wherein determining the relevance degree further comprises:
updating, by the one or more processors, the relevance degree based on the time relevance for the live comment.

7. The method of claim 1, wherein building the at least one knowledge model comprises, with respect to a subgraph in the at least one subgraph:
extracting, by the one or more processors, a topic for the subgroup based on a group of text features and external features for a group of nodes that are included in the subgroup; and
building, by the one or more processors, a knowledge model in the at least one model based on the topic.

8. The method of claim 1, further comprising:
in response to receiving a query that is inputted by a user related to the video, searching, by the one or more processors, the knowledge base for an answer related to the query.

9. A computer system comprising a computer processor coupled to a computer-readable memory unit, the memory unit comprising instructions that when executed by the computer processor implements a method comprising:
obtaining a plurality of live comments for a video, the plurality of live comments being associated with a plurality of fragments in the video, respectively;
classifying each live comment of the plurality of live comments into a topic of a plurality of topics associated with the video;
extracting a plurality of features from the plurality of live comments, respectively, wherein the plurality of features comprises a text feature for representing a text of a particular live comment, a time feature for representing a time point of a fragment in the video when a particular live comment is submitted, and a time relevance feature for representing a time relationship between a first live comment and a second live comment in the plurality of live comments;
generating a knowledge base for the plurality of live comments based on the plurality of features, wherein the knowledge base acts as a searchable index for the plurality of live comments, wherein generating the knowledge base comprises:
  generating a graph based on the plurality of features, the graph including: a plurality of nodes respectively corresponding to the plurality of live comments and a plurality of edges among the plurality of nodes;
  dividing the graph into at least one subgraph based on the plurality of nodes and the plurality of edges; and
  building at least one knowledge model that is included in the knowledge base based on the at least one subgraph; and
in response to detecting that a further live comment has been inputted by a user and includes a question regarding a live comment of the plurality of comments or the video, identifying a respective topic of the plurality of topics of the further live comment and searching the knowledge base for an answer to the question based on the topic.

10. The computer system of claim 9, wherein the plurality of features further comprises an external feature for representing a data item associated with a particular live comment that is obtained from an external knowledge base.

11. The computer system of claim 9, wherein the plurality of features further comprises an external feature for representing a data item associated with a particular live comment that is obtained from an external knowledge base and wherein generating the graph comprises:
  generating the plurality of nodes by, with respect to the live comment in the plurality of live comments, generating a node in the plurality of nodes that is corresponding to the live comment based on any of the text feature and the external feature for the live comment.

12. The computer system of claim 11, generating the graph further comprises:
  generating the plurality of edges by, with respect to the live comment and the further live comment:
    determining a relevance degree between the live comment and the further live comment based on features for the live comment and the further live comment; and
    in response to the relevance degree being above a predefined threshold, adding an edge between the node corresponding to the live comment and a further node corresponding to the further live comment.

13. The computer system of claim 12, wherein the method further comprises:
  in response to receiving a query that is inputted by a user related to the video, searching the knowledge base for an answer related to the query.

14. A computer program product comprising a computer readable storage medium having program instructions embodied therewith, the program instructions executable by an electronic device to cause the electronic device to perform a method, the method comprising:
  obtaining a plurality of live comments for a video, the plurality of live comments being associated with a plurality of fragments in the video, respectively;
  extracting a plurality of features from the plurality of live comments, respectively, wherein the plurality of features comprises a text feature for representing a text of a particular live comment, a time feature for representing a time point of a fragment in the video when a particular live comment is submitted, and a time relevance feature for representing a time relationship between a first live comment and a second live comment in the plurality of live comments;
  generating a knowledge base for the plurality of live comments based on the plurality of features, wherein the knowledge base acts as a searchable index for the plurality of live comments, wherein generating the knowledge base comprises:
    generating a graph based on the plurality of features, the graph including: a plurality of nodes respectively corresponding to the plurality of live comments and a plurality of edges among the plurality of nodes;
    dividing the graph into at least one subgraph based on the plurality of nodes and the plurality of edges; and
    building at least one knowledge model that is included in the knowledge base based on the at least one subgraph; and
  in response to detecting that a further live comment has been inputted by a user and includes a question regarding a live comment of the plurality of comments or the video, identifying a respective topic of the plurality of topics of the further live comment and searching the knowledge base for an answer to the question based on the topic.

15. The computer program product of claim 14, wherein the plurality of features further comprises an external feature for representing a data item associated with a particular live comment that is obtained from an external knowledge base.

16. The computer program product of claim 14, wherein the method further comprises:
  in response to receiving a query that is inputted by a user related to the video, searching the knowledge base for an answer related to the query.

* * * * *